BICYCLE LOCK BRACKET

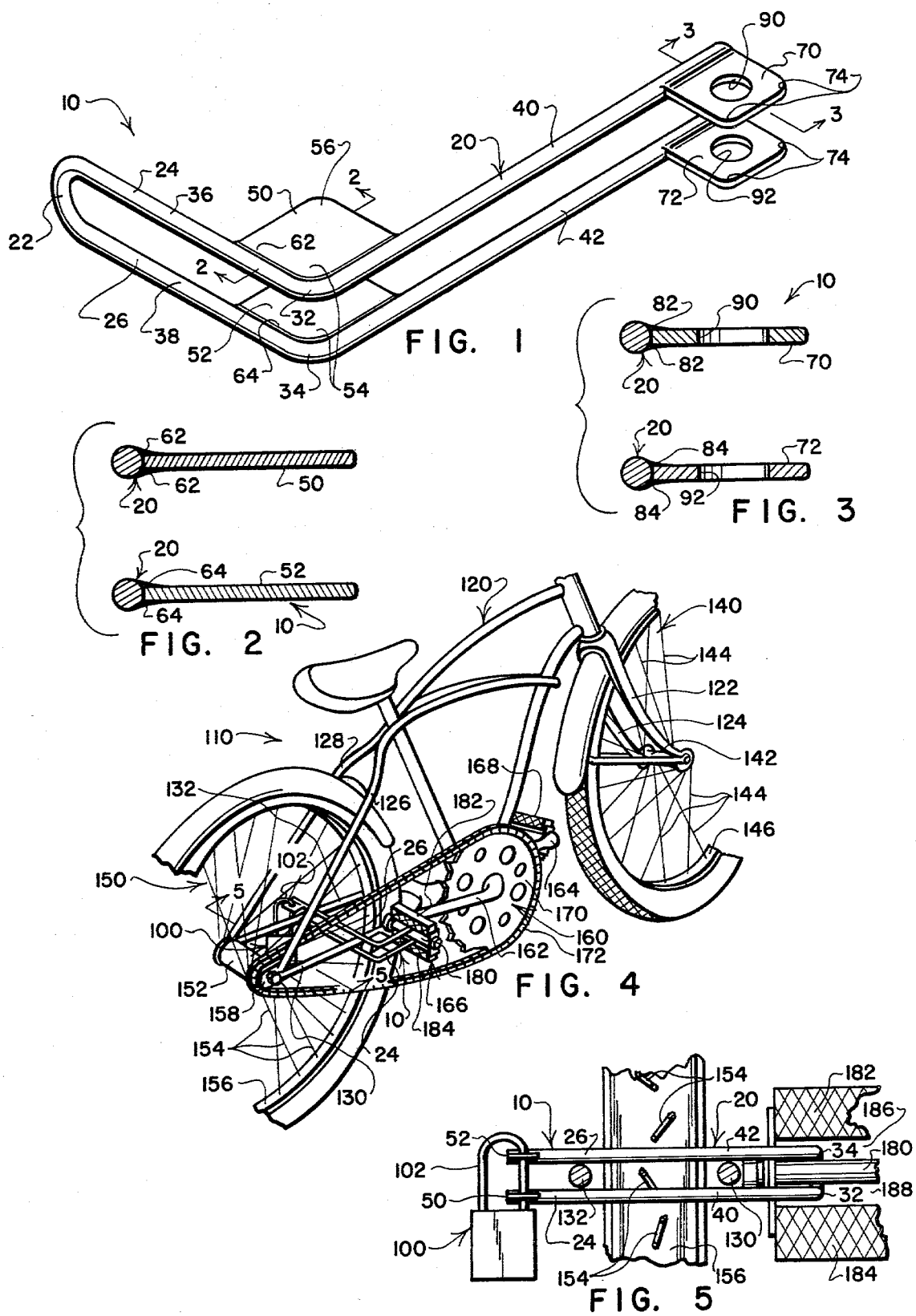

BACKGROUND OF THE INVENTION

1. Field of the Invention

The present invention relates generally to a bicycle lock bracket and, more particularly, to a bicycle lock bracket of simple construction for locking a pedal crank assembly and a rear wheel of a bicycle against rotation relative to the frame of the bicycle.

2. Prior Art

While many proposals have been made in efforts to provide simple and effective systems for locking bicycles to prevent their being stolen, most of the devices embodying these proposals suffer from one or more of the disadvantages of (1) being unduly expensive to fabricate, (2) being unduly difficult to install and remove, and/or (3) being too bulky to store for transit.

Studies have indicated that a major portion of bicycle thefts result not from carefully contrived planning on the part of well organized thieves, but rather due to a potential thief's encountering an unrestrained bicycle under circumstances which permit its being taken without being noticed. In many instances, bicycles are stolen while left unrestrained by their owners and while their owners are quite close at hand. If the bicycles had been restrained in an effective fashion to hinder their being ridden away, many of these types of thefts would have been prevented.

A significant drawback of prior proposals for bicycle locking systems is that they require more time and effort to use than many bicycle owners will tolerate. If anything more than the barest minimum of time is required to lock and unlock a bicycle, many owners will not bother to use a locking system even though the system may be readily at hand. A need clearly exists for a simple and effective system which will be accepted and utilized by bicycle owners for preventing bicycles from being readily ridden away.

SUMMARY OF THE INVENTION

The present invention overcomes the foregoing and other drawbacks of the prior art by providing a simple, inexpensive, and easy to use system for restraining the pedal crank assembly and the rear wheel of a bicycle against rotation relative to the bicycle's frame.

In preferred practice, a bicycle lock bracket is provided which is capable of being threaded (1) through a conventional bicycle pedal, (2) among the spokes of the bicycle's rear wheel, and (3) about a pair of the bicycle's frame struts, whereafter the bracket can be locked in place using a conventional padlock. The bracket has no relatively movable parts and can be installed, removed and stored quickly and easily.

The bracket preferably includes a pair of elongate, relatively rigid arms which extend in spaced, side-by-side (overlying) relationship. Each of the arms has a first end and a second end. The bracket includes structure which interconnects the arms in the vicinities of their first ends, and lock receiving formations for receiving the shackle of a padlock to interconnect the arms in the vicinities of their second ends. The arms are configured:

(i) to permit installation on a bicycle in a position wherein the spaced arms receive therebetween a portion of the bicycle's pedal crank assembly and portions of the bicycle's frame lying on opposite sides of the bicycle's rear wheel, and wherein the spaced arms extend among the spokes of the bicycle's rear wheel, whereby rotation of the bicycle's pedal crank assembly and the bicycle's rear wheel relative to the bicycle's frame is restrained;

(ii) to permit the shackle of a padlock to be received by the lock receiving formations after the bracket has been installed; and, (iii) to prevent removal of the bracket from its installed position so long as the shackle of a padlock is received by the lock receiving formations.

These and other advantages and a fuller understanding of the invention described and claimed in the present application may be had referring to the following description and claims taken in conjunction with the accompanying drawing.

BRIEF DESCRIPTION OF THE DRAWING

FIG. 1 is a perspective view of a bicycle lock bracket embodying the preferred practice of the present invention;

FIGS. 2 and 3 are sectional views as seen from planes indicated by lines 2—2 and 3—3 in FIG. 1;

DESCRIPTION OF THE PREFERRED EMBODIMENT

Figure 3:
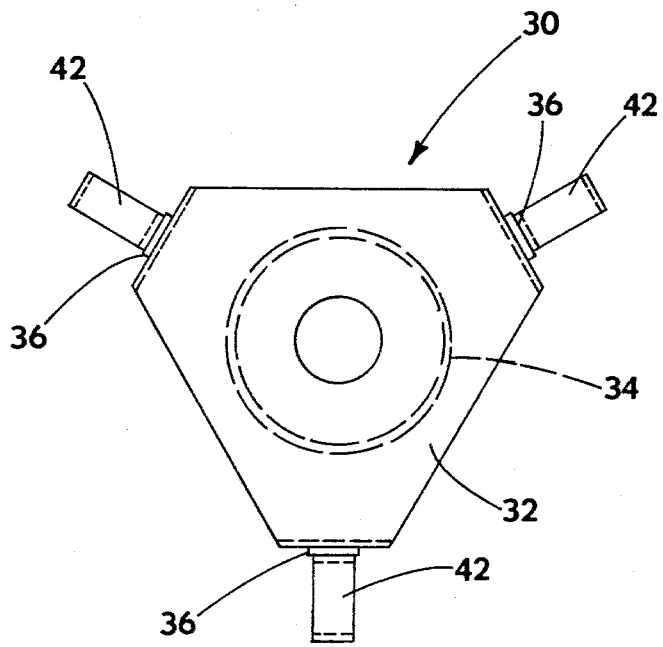

Referring to FIG. 1, a bicycle lock bracket embodying the preferred practice of the present invention is indicated generally by the numeral 10. The bracket 10 is a welded assembly of five parts including a rod 20 a pair of corner plates 50, 52 and a pair of lock receiving plates 70, 72.

The bracket 10 is easy to fabricate. A metal rod 20 of proper length is provided with a centrally located 180-degree bend, as indicated by the numeral 22, whereby the rod 20 takes on a U-shaped configuration having spaced, overlying, parallel-extending, first and second arms 24, 26. The arms 24, 26 are then provided with a 90-degree corner bends, as indicated by the numerals 32, 34, whereby the bracket 10 takes on an L-shaped configuration having spaced, overlying, parallel-extending arm portions 36, 38 and 40, 42. The first arm portions 36, 40 extend in a plane which parallels the plane of the second arm portions 38, 42.

The corner plates 50, 52 are identical one with another and are preferably formed in a stamping operation. The plates 50, 52 are of generally square shape but have rounded inner and outer corners 54, 56. The inner corners 54 are rounded to conform to the inner radius of the 90-degree corner bends 32, 34. The outer corners 56 are rounded only slightly as needed to give the bracket 10 an attractive appearance.

The corner plate 50 is secured to the first arm 24 by positioning it in the plane of the first arm portions 36, 40 with two of its sides and its rounded inner corner 54 engaging the arm portions 36, 40 and the corner bend 32, whereafter it is welded in place. The corner plate 52 is likewise positioned in the plane at the second arm portions 38, 42 with two of its sides and its rounded inner corner 54 engaging the arm portions 38, 42 and the bend 34, whereafter it is welded in place. The welds employed to secure the corner plates 50, 52 to the rod 20 are indicated by the numerals 62, 64 in FIG. 2.

The lock receiving plates 70, 72 are identical one with another and are preferably formed in a stamping operation. The plates 70, 72 are of generally square shape but have outer corners 74 which are slightly rounded as needed to give the bracket 10 an attractive appearance.

The lock receiving plate 70 is secured to the first arm 24 by positioning it in the plane of the first arm portions 36, 40 at a location near the end of the arm portion 40, whereafter it is welded in place. The lock receiving plate 72 is secured to the second arm 26 by positioning it in the plane of the second arm portions 38, 42 at a location near the end of the arm portion 42, whereafter it is welded in place. The welds employed to secure the plates 70, 72 to the rod 20 are indicated by the numerals 82, 84 in FIG. 3.

Referring to FIGS. 1, 3 and 5, aligned holes 90, 92 are formed through the lock receiving plates 70, 72. The holes 90, 92 are of sufficiently large diameter to permit the shackle 102 of a conventional padlock 100 to be readily inserted therethrough.

All five parts 20, 50, 52, 70, 72 of the bracket 10 are preferably formed from steel. The rod 20 is preferably formed from commercially available 0.25 inch diameter rod stock. The plates 50, 52, 70, 72 are preferably formed from 10 gauge plate stock. All exterior surfaces of the bracket 10 are deburred and smoothed after its parts have been assembled by welding. The entire bracket 10 is preferably protectively finished as by conventional plating or painting techniques to enhance its corrosion resistance.

Figure 4:
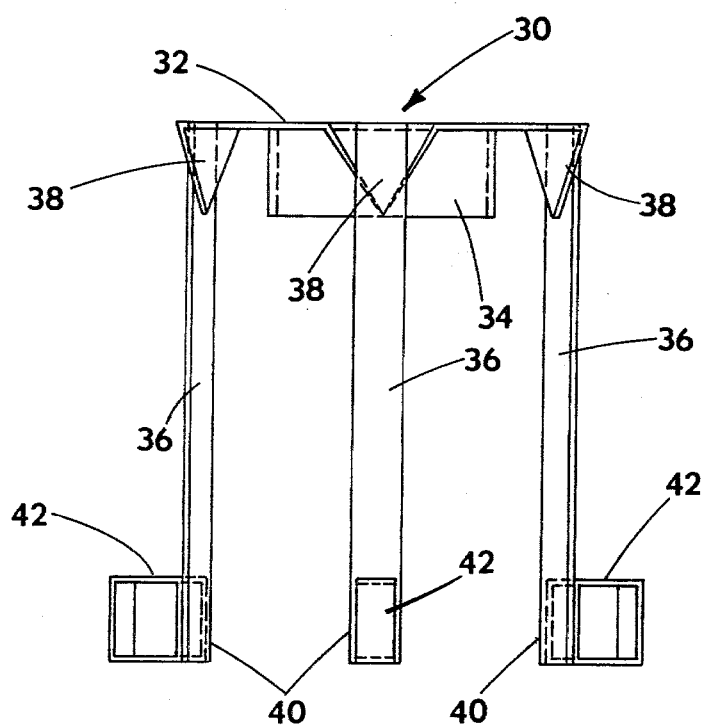
FIG. 4 is a perspective view of portions of a bicycle having the bicycle bracket of FIG. 1 installed thereon; and, FIG. 5 is a sectional view as seen from a plane indicated by a line 5—5 in FIG. 4.

Referring to FIGS. 4 and 5, portions of a conventional bicycle are indicated generally by the numeral 110. The bicycle 110 includes a frame 120, front and rear wheels 140, 150, and a pedal crank assembly 160.

The frame 120 includes a pair of forward wheel support struts 122, 124 and two pairs of rearward wheel support struts 126, 128 and 130, 132. The front wheel 140 is journaled on the forward struts 122, 124 by a conventional spindle assembly 142. Wire spokes 144 extend substantially radially outwardly from the spindle 142 to mount a rubber-tired wheel rim 146. The rearward struts 126, 128 and 130, 132 form welded assemblies extending on opposite sides of the rear wheel 150. The rear wheel 150 is journaled on the assemblies at the struts 126, 128, 130, 132 by a conventional spindle assembly 152. Wire spokes 154 extend substantially radially outwardly from the spindle 152 to mount rubber-tired wheel rim 156. A drive sprocket 158 is carried by the spindle 152 for driving the rear wheel 150.

The pedal crank assembly 160 includes a pair of crank arms 162, 164 which extend in radially opposite directions along opposite sides of the frame 120. A pair of pedals 166, 168 are secured to the crank arms 162, 164. A drive sprocket 170 is welded to the crank arms 162, 164. A roller chain 172 is reeved around the sprockets 158, 170 to drivingly correct the pedal crank assembly 160 with the rear wheel 150.

The pedals 166, 168 are identical one with another, each having a center stem 180. Referring to FIG. 5, a pair of pedal treads 182, 184 are supported in spaced relationship along opposite sides of the center stem 180. Spaces 186, 188 are defined between the pedal treads 182, 184 and the center stem 180.

The bracket 10 is configured such that the spacing between its first and second arms 24, 26 will enable the arms 24, 26 to be threaded through the spaces 186, 188, thence about the frame strut 130, through the plane of the rear wheel 150 (and hence among the wheel spokes 154) and thence about the frame strut 132, whereafter the bracket 10 may be secured in place by the padlock 100. The installed, locked position of the bracket 10 is illustrated in FIGS. 4 and 5.

When the bracket 10 is in its installed, locked position, it is operative to restrain rotation of the pedal crank assembly 160 and of the rear wheel 150 relative to the frame 120. By this arrangement, the bicycle 110 is effectively disabled and its likelihood of being stolen is thereby greatly reduced.

A feature of the bracket 10 lies in the extremely effective locking action it provides despite the simplicity and low-cost character of its construction. The bracket 10 securely and rigidly locks the pedal crank assembly 160 against rotation relative to the frame 120 and, by virtue of its being inserted through the plane of the rear wheel 150 among the spokes 154, likewise restrains the rear wheel 150 against rotation relative to the frame 120.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed. It is intended that the patent shall cover, by suitable expression in the appended claims, whatever features of patentable novely exist in the invention disclosed.

What is claimed is:

1. A bicycle lock bracket adapted to be threaded through pedal, frame and rear wheel portions of a bicycle for receiving the shackle of a padlock to lock a pedal crank assembly and a rear wheel of a bicycle against rotation relative to the bicycle's frame, comprising:
   (a) a pair of elongate, relatively rigid arms extending in spaced, side-by-side, overlying relationship, each of the arms having first and second ends;
   (b) interconnecting means for interconnecting the arms in the vicinities of their first ends;
   (c) lock receiving means for receiving the shackle of a padlock to interconnect the arms in the vicinities of their second ends; and,
   (d) the arms being configured:
      (i) to permit the bracket's being installed on a bicycle in a position wherein the spaced arms are threaded through portions of a bicycle pedal and about portions of the bicycle's frame which lie on opposite sides of the bicycle's rear wheel, and wherein the spaced arms extend among the spokes of the bicycle's rear wheel, whereby rotation of the bicycle's pedal crank assembly and the bicycle's rear wheel relative to the bicycle's frame is restrained by the presence of the bracket in its installed position;
      (ii) to permit the shackle of a padlock to be received by the lock receiving means after the bracket has been brought to its installed position; and,
      (iii) to prevent removal of the bracket from its installed position so long as the shackle of a padlock is received by the lock receiving means.

2. The bicycle lock bracket of claim 1 wherein the interconnecting means includes structure rigidly interconnecting the arms in the vicinities of their first-ends.

3. The bicycle lock bracket of claim 2 wherein the arms and the structure form integral parts of an elongate member which has been formed to assume a substantially U-shaped configuration with the structure forming a curved base leg interconnecting the arms.

4. The bicycle lock bracket of claim 1 wherein the lock receiving means comprise hole-defining formations on the arms in the vicinities of their second ends, the holes defined by such formations extending in a aligned relationship and being adapted to receive the shackle of a padlock.

5. A bicycle lock bracket for receiving the shackle of a padlock to lock a pedal crank assembly and a rear wheel of a bicycle against rotation relative to the bicycle's frame, comprising:
   (a) a pair of elongate, relatively rigid arms extending in spaced, side-by-side, overlying relationship, each of the arms having first and second ends;
   (b) interconnecting means for interconnecting the arms in the vicinities of their first ends;
   (c) lock receiving means for receiving the shackle of a padlock to interconnect the arms in the vicinities of their second ends;
   (d) the arms being configured:
      (i) to permit the bracket's being installed on a bicycle in a position wherein the spaced arms receive therebetween a portion of the bicycle's pedal crank assembly and portions of the bicycle's frame which lie on opposite sides of the bicycle's rear wheel, and wherein the spaced arms extend among the spokes of the bicycle's rear wheel, whereby rotation of the bicycle's pedal crank assembly and the bicycle's rear wheel relative to the bicycle's frame is restrained by the presence of the bracket in its installed position;
      (ii) to permit the shackle of a padlock to be received by the lock receiving means after the bracket has been brought to its installed position; and,
      (iii) to prevent removal of the bracket from its installed position so long as the shackle of a padlock is received by the lock receiving means;
   (e) the interconnecting means including structure rigidly interconnecting the arms in the vicinities of their first-ends;
   (f) the arms and the structure forming integral parts of an elongate member which has been formed to assume a substantially U-shapd configuration with the structure forming a curved base leg interconnecting the arms; and,
   (g) the arms having been further formed to assume a substantially L-shaped configuration with separate parts of each of the arms forming substantially orthogonally extending arm portions of the L-shaped configuration and with substantially right-angle corners interconnecting the arm portions.

6. The bicycle lock bracket of claim 4 additionally including reinforcing means provided on the arms in the vicinities of their right-angle corners to rigidify the arms and to resist bending of the arms in the vicinities of the corners.

7. A bicycle lock bracket for receiving the shackle of a padlock to lock a pedal crank assembly and a rear wheel of a bicycle against rotation relative to the bicycle's frame, comprising:
   (a) a pair of elongate, relatively rigid arms extending in spaced, side-by-side, overlying relationship, each of the arms having first and second ends;
   (b) interconnecting means for interconnecting the arms in the vicinities of their first ends;
   (c) lock receiving means for receiving the shackle of a padlock to interconnect the arms in the vicinities of their second ends;
   (d) the arms being configured:
      (i) to permit the bracket's being installed on a bicycle in a position wherein the spaced arms receive therebetween a portion of the bicycle's pedal crank assembly and portions of the bicycle's frame which lie on opposite sides of the bicycle's rear wheel, and wherein the spaced arms extend among the spokes of the bicycle's rear wheel, whereby rotation of the bicycle's pedal crank assembly and the bicycle's rear wheel relative to the bicycle's frame is restrained by the presence of the bracket in its installed position;
      (ii) to permit the shackle of a padlock to be received by the lock receiving means after the bracket has been brought to its installed position; and,
      (iii) to prevent removal of the bracket from its installed position so long as the shackle of a padlock is received by the lock receiving means; and,
   (e) the arms being configured to permit their being inserted between the traction treads of a selected bicycle pedal while causing a central stem of the pedal to be received between the arms, whereby istallation of the bracket about a portion of the bicycle's pedal crank assembly is effected at the location of the selected pedal.

8. A bicycle lock bracket adapted to be threaded through pedal, frame and rear wheel portions of a bicycle and adapted to receive a padlock to lock the bicycle's pedal crank assembly and the bicycle's rear wheel against rotation relative to the bicycle's frame, comprising:
   (a) a pair of elongate, relatively rigid, generally L-shaped arms having first and second ends, the arms extending in spaced, side-by-side, overlying relationship and each having first and second arm portions, the first and second arm portions of each arm being interconnected by a substantially right angle corner structure;
   (b) interconnecting means rigidly interconnecting the first arm portions in the vicinities of the first ends;
   (c) lock receiving formation means provided on the second arm portions in the vicinities of the second ends for receiving the shackle of a padlock to interconnect the arms in the vicinities of their second ends; and,
   (d) the arms being configured:
      (i) to permit the bracket's being installed on a bicycle in a position wherein:
         (1) the first arm portions receive therebetween, at a location near the interconnecting means, a portion of a bicycle pedal;
         (2) the second arm portions receive therebetween portions of the bicycle's frame which lie on opposite sides of the bicycle's rear wheel; and,
         (3) the second arm portions extend through the plane of the rear wheel of the bicycle and among the spokes of the rear wheel;
      (ii) to permit the shackle of a padlock to be received by the lock receiving formation means after the bracket has been brought to its installed position; and, (iii) to prevent removal of the bracket from its installed position so long as the shackle of a padlock is received by the lock receiving means.

9. The bicycle lock bracket of claim 8 wherein the arms and the interconnecting structure comprise integrally formed parts of a common member.

10. The bicycle lock bracket of claim 8 additionally including reinforcing means provided on the arms in the vicinities of the corner structures to interconnect the first and second arm portions of each arm to rigidify the arms in the vicinities of the corner structures.

11. The bicycle lock bracket of claim 10 wherein the lock receiving formation means comprise hole-defining members secured to the arms in the vicinities of their second ends, the holes defined by such members being aligned and being adapted to receive the shackle of a padlock.

12. The bicycle lock bracket of claim 11 wherein:
 (a) all parts of the bracket are formed from metal;
 (b) the reinforcing means comprise a first pair of flat plates which are welded to the arms in the vicinities of their corner structures; and,
 (c) the hole-defining members comprise a second pair of flat plates which are welded to the arms in the vicinities of their second ends.

* * * * *